Feb. 13, 1934.                    C. S. FRANKLIN                    1,947,255
                                 TELEMETRIC SYSTEM
                                 Filed Oct. 5, 1929

Inventor:
Charles S. Franklin,
by Charles A. Mullen
His Attorney.

Patented Feb. 13, 1934

1,947,255

UNITED STATES PATENT OFFICE 1,947,255

TELEMETRIC SYSTEM

Charles S. Franklin, Hollywood, Calif., assignor to General Electric Company, a corporation of New York Application October 5, 1929. Serial No. 397,613

7 Claims. (Cl. 177—351)

My invention relates to telemetric systems and has for its object to effect certain improvements in the receiving systems used in connection therewith.

Telemetric systems are now known in the operation of which current impulses are transmitted in succession over a telemetering channel, each impulse corresponding to a particular meter, or other device, or element, the reading or condition of which is to be remotely indicated, and comprising current having a characteristic determined in accordance with the position or condition of the corresponding device. Means are provided in connection with systems of this type whereby a plurality of receiving instruments are connected to the channel in succession each connection being made in response to an interruption of current between impulses. In this way each receiving instrument may be caused to respond to current having a characteristic determined in accordance with a corresponding transmitting element. Such a system is disclosed in copending application Serial No. 202,961, Alan S. Fitzgerald, filed July 1, 1927, Patent No. 1,849,827, issued March 15, 1932, entitled Telemetric system and which is assigned to the same assignee as my present application.

One of the objects of my invention is to provide means whereby the receiving instruments are each connected to the channel only during its appropriate impulse when current having a characteristic determined in accordance with a corresponding transmitting element is received. In this way, any false deflection of the different receiving instruments as due to being connected to the channel during a portion of an impulse when the character of the received current is determined by a non-corresponding transmitting element, is avoided.

The novel features which I believe to be characteristic of my invention are set forth with particularity in the appended claims. My invention, itself, however, both as to its organization and method of operation together with further objects and advantages thereof may best be understood by reference to the following description taken in connection with the accompanying drawing in which Fig. 1 represents an embodiment of my invention and Fig. 2 represents a modification thereof.

Figure 1:
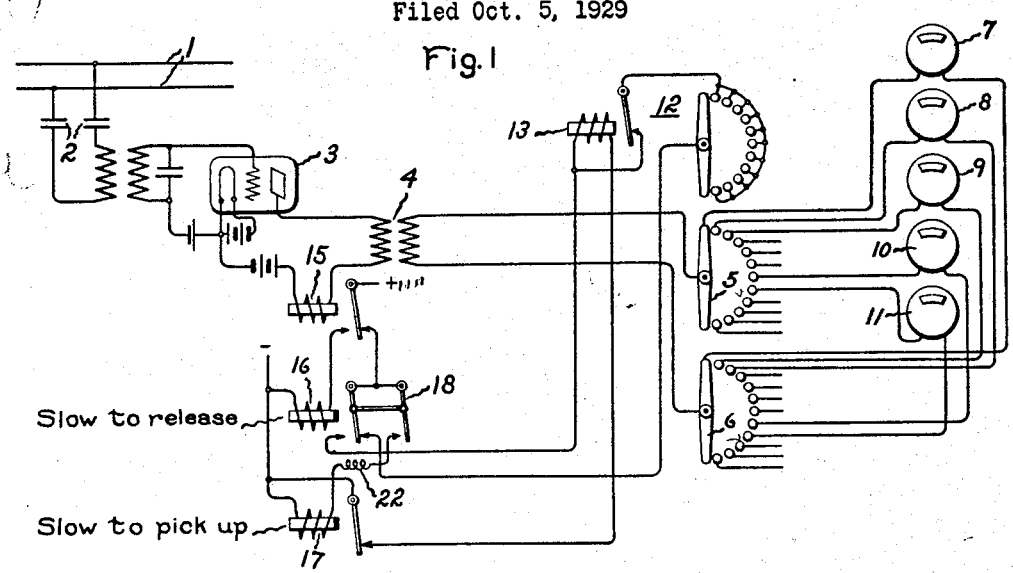
Figure 2:
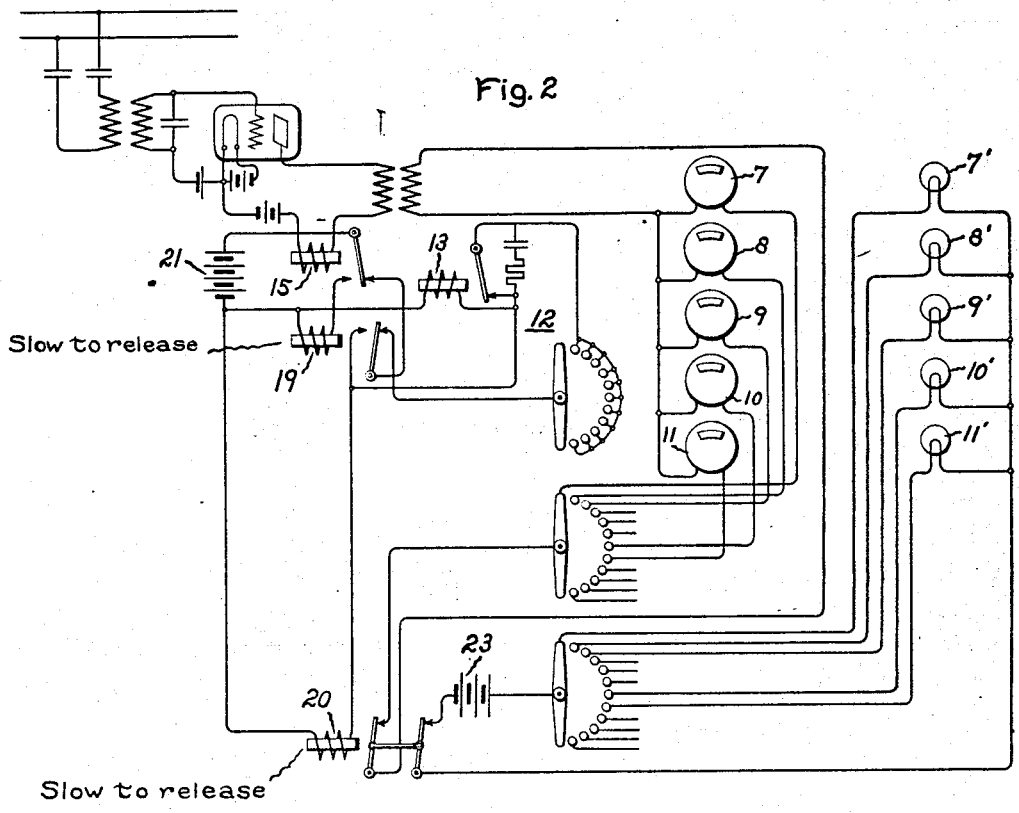

Referring to Fig. 1 of the drawing, I have indicated at 1 a line which may be used for telemetering purposes. This line may comprise the conductors of a power distribution system over which carrier current impulses are transmitted in succession; each impulse being modulated, for example, with current having a frequency determined in accordance with the position of a movable element at the transmitting station the position of which is to be remotely indicated. The transmitting system may be arranged, as indicated, in the above mentioned application, to transmit impulses of this nature successively, and successive impulses being modulated in accordance with the position of the different transmitting elements sequentially and in rotation. These carrier currents are received through coupling condensers 2 and are impressed in the usual way upon the grid of an electron discharge detector 3. The modulating currents resulting from detection of the received carrier currents are supplied from the anode circuit of the detector 3 through a transformer 4, and switching elements 5 and 6 to the different receiving instruments 7, 8, 9, 10, 11, etc., dependent upon the position which the switch elements 5 and 6 occupy. The instruments 7, 8, 9, 10, 11 may comprise frequency responsive indicating devices each of which responds to the frequency of current with which the corresponding received carrier impulse is modulated, thereby to indicate the position of the corresponding remote element.

The switch elements 5 and 6 comprise wipers of a selector switch designated as a whole as 12 on the drawing. This selector switch has a motor magnet 13 which is adapted; through a suitable ratchet and pawl arrangement, upon each deenergization thereof to actuate the wipers of the selector switch from their instant position to the next succeeding position thereby to connect the various meters 7, 8, 9, etc., to the receiving channel in succession. Relays 15, 16 and 17 are provided to control the energization of motor magnet 13 and to cause deenergization thereof in response to each successive interruption in the received carrier.

The operation of the system is as follows: The relays 15, 16 and 17 and the selector switch 12 are shown in the position which they occupy when the carrier has been interrupted for a predetermined interval longer than the interruptions which occur between impulses, the receiving instrument 7 being connected to the carrier channel. During an impulse of received carrier the current in the anode circuit of detector 3 increases causing operation of relays 15 and 16. The alternating current resulting from demodulation of the received carrier impulse will then be supplied through transformer 4 and switching elements 5 and 6 to receiving instrument 7. When the carrier is interrupted for a predetermined short interval of time, as between the successive impulses, a circuit will be completed, due to the slow releasing character of relay 16, which extends from positive potential at the armature of relay 15 through left hand armature 18 of relay 16 and its left hand contact, motor magnet 13 and armature of relay 17 to the negative side of the source of potential. The motor magnet 13 will then operate its pawl to a position such that when deenergized the switch will be operated to the next position. A circuit will also be completed through the right hand contacts of relay 15, right hand armature and contact of relay 16 and winding of relay 17. As stated above these last two circuits are completed due to the fact that relay 16 is slow to release and does not operate its armature to the right hand position until a predetermined time interval following the deenergization of relay 15. This time interval is such that this relay does not operate during the short interruptions between impulses. After a certain predetermined interval following energization of relay 17, its armature is attracted thereby interrupting the circuit of motor magnet 13 and causing operation of the selector switch thereby to connect receiving instrument 8 to the carrier channel. When the carrier is again received, as during the next impulse the armature of relay 15 will be operated again to the left. The position of the armature of relay 16 however will be unchanged. Relay 17 will be deenergized and will actuate its armature to the position shown. When the carrier is again interrupted the foregoing cycle of operations will again take place resulting in the receiving instrument 9 being connected to the telemetering channel. The time required for the relay 17 to actuate its armature after potential is applied to its winding is such that the motor magnet 13 has time to become fully energized after deenergization of relay 15 and such that motor magnet 13 is again deenergized and has sufficient time to cause operation of selector switch before carrier is again received. Inductance 22 may if desired, be inserted in circuit of relay 17 to aid in obtaining this time delay characteristic.

In this way, each of the receiving meters is connected to the carrier channel prior to the initiation of its corresponding carrier impulse. It will be apparent that were this not the case and were the arrangement such that the selector switch is operated to its succeeding position after initiation of the succeeding impulse, each meter would be connected to the carrier channel during a portion of an impulse during which the modulation frequency is determined by a non-corresponding transmitting element and accordingly the meter would be seen to deflect one way or the other just prior to each operation of the selector switch, the deflection having a direction dependent upon the position of the next element the position of which is to be transmitted.

When the carrier is interrupted for a predetermined interval longer than the intervals between the various telemetering impulses, relay 16 will deenergize and complete a circuit extending from positive potential at the armature of relay 15 through left hand armature 18 of relay 16 and its right hand contact, upper wiper of switch 12 and its cooperating bank of contacts, all except the normal contact of which are connected together, interrupter contacts and motor magnet 13, to negative potential at the armature of relay 17. This circuit constitutes a buzzer circuit for the motor magnet 13 causing the motor magnet to operate switch 12 to its normal position where the buzzer circuit is interrupted by the upper wiper of the bank 12 engaging in its normal contact. Thus it will be seen that at the end of each transmission period when the position of each of a plurality of movable elements have been transmitted in succession by means of impulses separated by interruptions having a predetermined time interval of duration a longer interruption may be produced during which the receiving system will be restored to its normal position thereby connecting a predetermined meter, as for example, the meter 7, to the telemetering channel in readiness for the next cycle of operations.

In the modification of my invention shown in Fig. 2 a pair of contacts of relay 20 are included in a common portion of the circuit of the receiving instruments this relay being so controlled that it completes the connection of each of the meters to the telemetering channel at a proper time to avoid the undesired results pointed out above. In this figure the lower wiper of selector 12 is also arranged to connect successively each of a plurality of signal lamps in circuit with a source of potential 23 simultaneously with the connection of a corresponding receiving instrument to the receiving channel; the lighting of the lamp indicating that the corresponding instrument is then connected to the receiving channel.

The operation of this form of my invention is as follows: The system is shown in the condition which it assumes when an interruption longer than the interruptions between carrier impulses has occurred. During the first carrier impulse relay 15 will be energized and will operate its armature to the left thereby energizing relay 19. This relay is slow to release such that upon the first interruption of the carrier, a circuit is completed extending from the positive side of the source of potential 21 through the armature of relay 15 and its right hand contact, armature of relay 19 and its left hand contact and the windings of relay 20 and motor magnet 13 connected in parallel to the negative side of the source of potential. Relay 20 then operates and immediately disconnects the meter 7 from the carrier channel. Motor magnet 13 becomes energized and actuates its pawl to a position such that when the motor magnet becomes deenergized the selector switch will be operated to the next position. When the succeeding carrier impulse is received the above traced circuit is interrupted at the contacts of relay 15 and motor magnet 13 and relay 20 become deenergized. Motor magnet 13 immediately operates the selector switch to the next position thereby connecting receiving instrument 8 to the carrier channel. Relay 20 then releases its armature and completes the circuit of the instrument 8. This relay is sufficiently slow to release however to permit the complete operation of the selector switch before the circuit of the instrument to be connected to the channel is completed. In this way all transient effects are eliminated and each receiving instrument is connected to the carrier channel only during its appropriate carrier impulse. When the position of all the remote elements has been indicated and an interruption, longer than those which occur between impulses, occurs, relay 19 will be deenergized thereby completing a circuit extending from the positive side of the source of potential through the armature and right hand contact of relay 15, armature and right hand contact of relay 19, upper wiper and associated bank of contacts of selector switch 12 interrupter contacts and motor magnet 13 to the negative side of the source of potential. This circuit constitutes a buzzer circuit for the motor magnet 13 causing it to operate the selector switch to its normal position where the buzzer circuit is interrupted when the upper wiper of the switch 12 engages its normal contact. The system is then in readiness for the next cycle of indications.

While I have shown particular embodiments of my invention, it will be understood that many modifications may be made both in the circuit arrangement and in the instrumentalities employed and I contemplate by the appended claims to cover any such modifications as fall within the true spirit and scope of my invention.

What I claim as new and desire to secure by Letters Patent of the United States, is:

1. The combination, in a telemetric system in which current impulses are transmitted through a telemetering channel, each impulse having a frequency determined in accordance with the condition of an element to be remotely indicated, and said impulses being separated by predetermined time intervals, of a plurality of frequency responsive indicating devices located at the point where indications are to be made, and means responsive to the interruptions between impulses for successively connecting said indicating devices to said channel, whereby currents from said channel are received by said indicating devices, said means being operable to disconnect each indicating device from the channel before the succeeding impulse begins.

2. The combination, in a high frequency telemetering system, of a high frequency receiver, a plurality of receiving instruments, means for successively connecting each of said instruments to the output circuit of said high frequency receiver, each connection being made in response to an interruption between impulses of the received high frequency, whereby each receiving instrument is connected to the receiver during an appropriate impulse of received high frequency and means for normally preventing any instrument from being connected to the receiver during any impulse other than the one appropriate to the particular instrument.

3. The combination, in a telemetric system in which current impulses are transmitted through a telemetering channel, each impulse having a frequency determined in accordance with the position of an element to be remotely indicated, of a plurality of frequency responsive indicating devices, means including a step by step selector switch for successively connecting said indicating devices to the channel, said switch having a plurality of positions and a stepping magnet, means responsive to an interruption in current in said channel to energize said magnet, and means operable subsequently to deenergize said magnet thereby to cause said switch to operate to its next position, and time delay means for causing the connection of each meter to the channel to be interrupted before the succeeding impulse begins.

4. The combination, in a telemetric system in which current impulses are transmitted through a telemetering channel, each impulse having a frequency determined in accordance with the position of an element to be remotely indicated, of a plurality of frequency responsive indicating devices, means including a step by step selector switch for successively connecting said indicating devices to the channel, said switch having a plurality of positions and a stepping magnet, means responsive to an interruption in current in said channel to energize said magnet, and time delay means for deenergizing said magnet before the initiation of the succeeding impulse, said switch being arranged to operate to the next position in response to deenergization of said magnet.

5. The combination, in a carrier current telemetering system, in which carrier impulses are transmitted to a remote point, each impulse being modulated with current having a frequency determined in accordance with the position of an element to be indicated at said remote point, of a carrier current detector at said remote point, a plurality of frequency responsive indicating devices at said point, step by step switching means for successively connecting said indicating means to said detector, said switching means including a stepping magnet, time responsive means, means responsive to an interruption in the supply of carrier current to said detector for energizing said magnet and said time responsive means, said time responsive means being operable to deenergize said magnet after a predetermined time interval and before initiation of a succeeding impulse, and additional means responsive to an interruption of longer duration for causing said switching means to be operated to a predetermined position.

6. The combination, in a telemetric system in which current impulses are transmitted through a telemetering channel, each impulse having a frequency determined in accordance with the position of an element to be remotely indicated, of a plurality of frequency responsive indicating devices, means including a step-by-step selector switch for successively connecting said indicating devices to said channel, said switch having a plurality of positions and a stepping magnet, means responsive to a time interval longer than those occurring between successive impulses for restoring said selector switch to a predetermined position, said first means including a time responsive means and means responsive to the termination of any impulse for energizing said stepping magnet and said time responsive means, said time responsive means operating after any impulse to deenergize said magnet after a predetermined time interval and before the initiation of a succeeding impulse.

7. The combination, in a telemetric system wherein carrier current impulses are transmitted through a telemetric channel, each impulse being modulated with current having a frequency determined in accordance with the position of an element to be remotely indicated, of a carrier current detector, a plurality of frequency responsive indicating devices, step-by-step switching means for successively connecting said indicating devices to said detector during the time interval between said impulses, means energized upon initiation of said impulses and responsive to a time interval greater than that between said impulses, an additional time responsive means, a stepping magnet for said switch, and means responsive to the termination of an impulse for energizing said stepping magnet and said additional time responsive means, said additional time responsive means operating to deenergize said magnet after a predetermined time interval and before initiation of a succeeding impulse, said first means in cooperation with said additional time responsive means operating to restore said switch to its original position in response to a time interval in excess of that between said impulses.

CHARLES S. FRANKLIN.